United States Patent Office 3,322,525
Patented May 30, 1967

3,322,525
METHOD OF COMBATING WEEDS
Henry Martin, Basel, Hans Aebi, Riehen, and Ludwig Ebner, Stein, Aargau, Switzerland, assignors to Ciba Limited, Basel, Switzerland, a company of Switzerland
No Drawing. Filed Jan. 18, 1966, Ser. No. 521,448
Claims priority, application Switzerland, Feb. 8, 1962, 1,567/62
10 Claims. (Cl. 71—2.3)

This is a continuation-in-part of our copending application Ser. No. 352,414, filed Mar. 2, 1964, which is a division of our copending application Ser. No. 256,243, filed Feb. 5, 1963, now abandoned.

The present invention provides a method of combating weeds which comprises applying to the area where the weed-combating effect is desired, a weed-killing amount of a compound of the formula

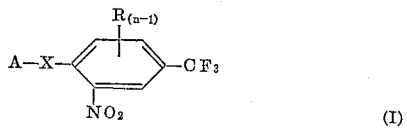

(I)

in which A represents a member selected from the group consisting of the phenyl radical and a phenyl radical substituted in at most 3 places by a member selected from the group consisting of the chlorine atom, the bromine atom, a lower alkyl group, a lower alkoxy group, the $CF_3$— group, the nitro group, the cyano group, the thiocyano group and the sulfonamide group, R represents a member selected from the group consisting of the chlorine atom, the bromine atom, a lower alkyl group, a lower alkoxy group, the $CF_3$— group, the nitro group, the cyano group, the thiocyano group and the sulfonamide group, and n represents a whole number of at most 2, and X represents a member selected from the group consisting of oxygen consisting of oxygen and sulfur.

The present invention provides further herbicidal preparations containing as active principle a compound of the formula

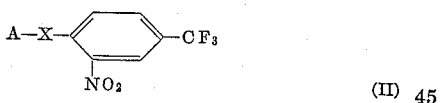

(II)

wherein A represents a phenyl radical substituted by a member selected from the group consisting of the bromine atom, 2 to 3 chlorine atoms, 2 alkyl radicals, a lower alkoxy radical, the nitro group, the $CF_3$— group, the $-SO_2NH_2$ group, the cyano group and the group —SCN, and X represents a member selected from the group consisting of oxygen and sulfur, and in addition therewith a carrier.

The compounds of the general Formula I are useful as herbicides, more particularly for selectively combating weeds, e.g. in group cultures.

Compounds of the general Formula II that are particularly effective are those wherein X represents oxygen.

As examples of compounds of the general Formula I there may be mentioned:

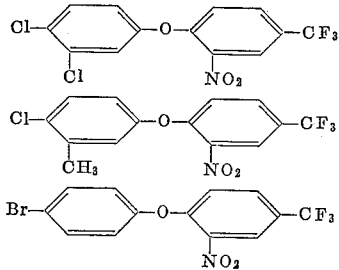

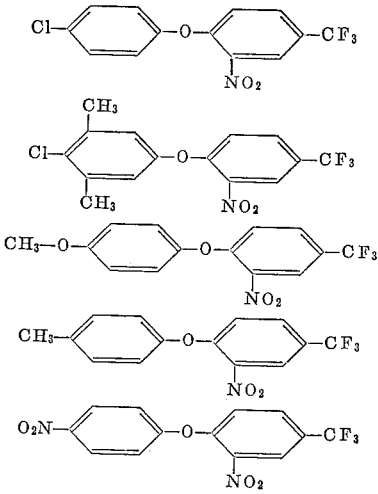

(M.P. 85–86° C. prepared according to Example 4a).

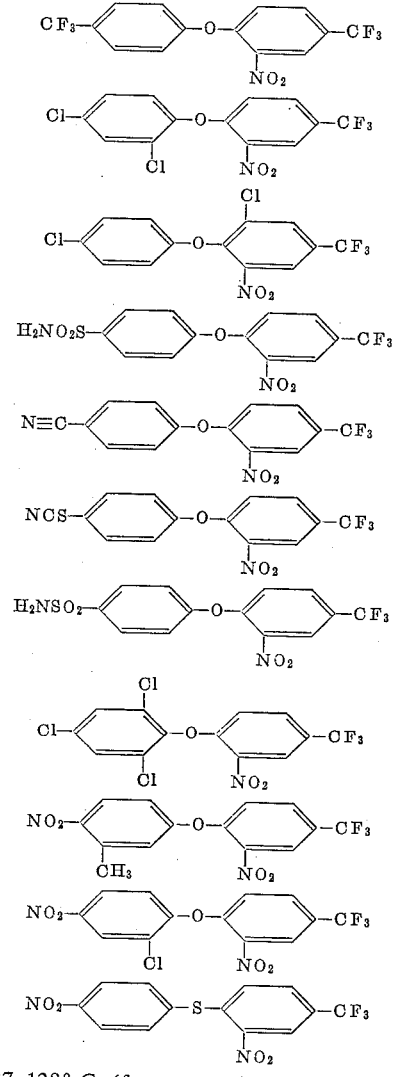

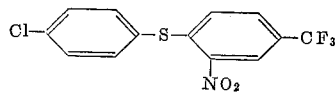

M.P.: 127–128° C. (from para-nitro-thiophenolate and 3-nitro-4-chloro-benzotrifluoride).

M.P.: 109–110° C. (from para-chloro-thiophenolate and 3-nitro-4-chloro-benzotrifluoride).

The compounds of the general Formula I display pronounced pre-emergence and post-emergence effects, above all towards different kinds of Gramina and are, for example, excellently suited for weed control in grain cultures and in cultures of dicotyledons.

The compounds of the general Formula I are advantageously used in the form of preparations containing the active principle in emulsified, dispersed or dissolved form, or incorporated with dusting agents, either by themselves or in conjunction with other weed killers, fertilizers or pesticides. To manufacture solutions suitable for immediate spraying there are used, for example, petroleum fractions having a medium to high boiling range, such as Diesel oil or kerosene, also coal tar oils, oils of vegetable or animal origin, and hydrocarbons of medium to high molecular weight, such as alkylated naphthalene or tetrahydronaphthalene, if desired with the use of mixtures of xylenes or toluenes, or ketones, or alcohols such as cyclohexanone or cyclohexanol, also chlorinated hydrocarbons such as tetrachloroethane, trichlorobenzene, trichlorotoluene or chloroxylenol.

Aqueous forms of application are prepared from emulsion concentrates, pastes or wettable spray powders by addition of water. Suitable emulsifying or dispersing agents are non-ionic products, for example condensation products of ethylene oxide with aliphatic alcohols, amines or carboxylic acids having a long-chain hydrocarbon radical of about 10 to 30 carbon atoms, such as the condensation product from:
octadecyl alcohol with 25 to 30 mols of ethylene oxide, or commercial oleylamine with 15 mols of ethylene oxide, or dodecylmercaptan with 12 mols of ethylene oxide.

From among suitable anionic emulsifying agents there may be mentioned:
the sodium salt of dodecyl-benzensulfonic acid, the potassium or triethanolamine salt of oleic or abietic acid or of mixtures of these acids, and the sodium salt of a petroleum-sulfonic acid.

Suitable cationic dispersing agents are quaternary ammonium compounds, such as cetyl pyridinium bromide or dihydroxyethyl benzyldodecyl ammonium chloride.

For the manufacture of scattering or dusting preparations, including for instance granulates, there may be used as solid vehicles talcum, kaolin, bentonite, calcium carbonate, calcium phosphate or carbon, cork meal, wood meal or other materials. With the various forms in which the new compounds are applied there may be incorporated the conventional additives capable of improving the distribution, adhesion, stability to rain, or the penetration, such as fatty acids, resins, glue, casein or, for example, also alginates.

The terms "weeds" and "undesired plants" that can be controlled with the new preparations include also undesired culture plants, for example such as have been grown previously on the field to be treated.

The compounds of the general Formula I can be prepared by known methods, for example, by reacting a compound of the general formula

A—XH (in which A and X have the meaning given it in defining the general Formula I with a compound of the general formula

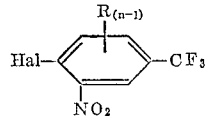

in which Hal represents a halogen, preferably a chlorine or bromine atom—accompanied by elimination of a compound H Hal.R and $n$ have the meaning given in Formula I.

The reaction is advantageously carried out in a solvent, for example in water, dimethylformamide or a mixture of dimethylformamide and water. The reaction is preferably performed at the boiling temperature of the solvent. In order to neutralize the hydrohalic acid formed, it is of advantage to work in the presence of an alkali, for example an alkali hydroxide, carbonate or bicarbonate.

The compounds of the invention possess further a significant effectiveness against harmful insects, more particularly an ovicidal action against *Ephestia kuehniella*, against harmful micro-organisms more particularly against phytopathogenic fungi, such as *Septoria apii*, against harmful acarids and against harmful nematodes, such as *Panegrellus redivivus*. The action of the compound of the formula

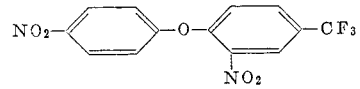

against weeds and the pests set forth above is particularly significant.

The following examples illustrate the invention. Parts and percentages are by weight.

*Example 1*

(a) The compound of the formula

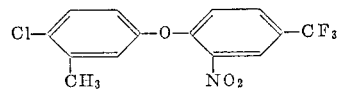

is prepared in the following manner:

A mixture of 142.4 g. of para-chlorometacresol and 225.4 g. 3-nitro-4-chlorobenzotrifluoride is heated in a flask to 150° C., and at the same temperature a solution of 45 g. of caustic potash in 56 cc. of water is dropped in within 90 minutes. The bulk of the water in the flask is distilled off, while returning the oily phase passing over together with the water to the flask. The reaction material in the flask is then heated for 6½ hours at 175° C., poured into a porcelain dish, acidified with hydrochlorid acid and then transferred to a suitable flask from which a steam distillation is carried out. The residue is poured into a mortar where it solidifies. The mass is then washed on a suction filter until the washings run neutral, dried under vacuum at 50° C. and distilled in a high vacuum.

Boiling point: 130 to 140° C. under 0.05 mm. Hg pressure. On recrystallization from hexane the resulting pure product melts at 58 to 58.5° C. Yield: 260 grams.

*Anaylsis.*—Calculated, percent: C, 50.70; H, 2.72; N, 4.22; Cl, 10.69. Found, percent: C, 50.91; H, 2.48; N, 4.10; Cl. 10.80.

By the method described under (a) above also the following compounds may be prepared:

(b)
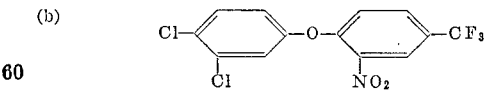

(from 3:4-dichlorophenol and 3-nitro-4-chlorobenzotrifluoride) in the form of a liquid boiling at 134–138° C. under 0.07 mm. Hg pressure.

*Analysis.*—Calculated, percent: C, 44.34; H, 1.72; N, 3.98; Cl, 20.14. Found, percent: C, 44.15; H, 1.60; N, 4.01, Cl, 20.19.

(c)
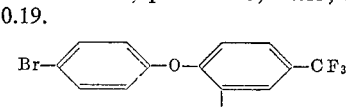

(from para-bromophenol and 3-nitro-4-chlorobenzotrifluoride). Melting point (after recrystallization from hexane): 46–47° C.

*Analysis.*—Calculated, percent: C, 43.12; H, 1.95; N, 3.87; Cl, 22.07. Found, percent: C, 43.17; H, 1.98; N, 3.61; Cl, 22.29.

(d)
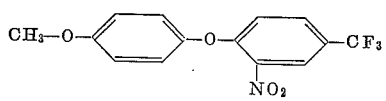

(from para-methoxyphenyl and 3-nitro-4-chlorobenzotrifluoride). Boiling point: 175–180° C. under 2.5 mm. Hg pressure. Melting point: (after recrystallization from hexane): 50.5–52° C.

*Analysis.*—Calculated, percent: C, 53.68; H, 3.22; N, 4.47. Found, percent: C, 53.9; H, 3.1; N, 4.6.

(e)
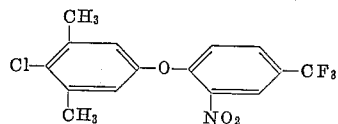

(from 4-chloro-3:5-dimethylphenol and 3-nitro-4-chlorobenzotrifluoride).

Boiling point: 175–182° C. under 2 mm. Hg pressure.
Melting point: (after recrystallization from hexane): 105–106° C.

*Analysis.*—Calculated, percent: C, 52.12; H, 3.21; N. 10.26. Found, percent: C, 52.2; H, 2.8; N, 10.4.

*Example 2*

There are prepared spray powders each containing 20% of one of the compounds (a) to (e) of Example 1, as well as 10% of an emulsifying agent consisting of a mixture of an alkylphenol polyglycol ether (for example the polyglycol ether from para-isooctylphenol with a calcium salt or magnesium salt of an alkyl-aromatic sulfonic acid, for example monolauryl benzenemonosulfonic acid).

The spray powders are mixed with any desired proportion of water, stable dispersions being obtained.

*Example 3*

Flowerpots filled with earth are seeded in a greenhouse with the following plants: Linum, Spinacia, Lactuca, Cucumis, Daucus, Phaseolus, Beta, Lepidium, Alopecurus, Poa, Dactylis, Lolium, Cynosurus, Agrostis, Phleum, Festuca, Bromus, Triticum, Avena and Hordeum.

The pre-emergence treatment is performed 2 days after seeding. The post emergence treatment is carried out 12 to 14 days after planting the aforementioned seeds, that is to say after the plants have developed the second true leaf.

Each pot is treated with a spray broth which has been prepared as described in Example 2 and contains 0.1% of the active principle described under (b) in Example 1, corresponding to an amount of 6 kg. of active principle per hectare. Evaluation performed 20 days after the treatment reveals the following values (0=no effect, to 10=plant completely killed off):

|  | Pre-emergence | Post-emergence |
|---|---|---|
| Dicotyledons: |  |  |
| Linum | 2 | 9 |
| Spinacia | 0 | 8 |
| Lactuca | 1 | 10 |
| Daucus | 0 | 1 |
| Phaseolus | 0 | 1 |
| Beta | 3 | 9 |
| Lepidium | 1 | 9 |
| Monocotyledons: |  |  |
| Alopecurus | 10 | 9 |
| Poa | 10 | 10 |
| Dactylis | 10 | 9 |
| Lolium | 10 | 10 |
| Cynosurus | 9 | 9 |
| Agrostis | 10 | 10 |
| Phleum | 10 | 10 |
| Holcus | 10 | 10 |
| Festuca | 10 | 10 |
| Bromus | 10 | 9 |
| Triticum | 1 | 3 |
| Avena | 9 | 8 |
| Hordeum | 0 | 1 |

Similar results are obtained by using instead of the emulsion prepared according to Example 2 one which contains the active principle shown under *a* or *c* in Example 1 instead of the active principle *b* of Example 1 and is otherwise of identical composition.

As the above test results show the new preparations are especially suitable for the selective control of grass weeds in grain cultures, for example in wheat or barley fields, and for use in certain dicotyledon cultures.

*Example 4*

(a) A solution of 10 g. of sodium hydroxide in 10 ml. of water is added dropwise to a solution of 34.8 g. of para-nitrophenol in 50 ml. of dimethylformamide, and the whole is heated to 120° C., 56.4 g. of 4-chloro-3-nitrobenzo trifluoride are added in the course of 10 minutes and the reaction mixture is then kept at reflux temperature (bath temperature 150° C.) for 2 hours while stirring thoroughly. The resulting reaction product is then poured on to ice, filtered, washed thoroughly first with water and then with ligroin. Melting point: 85–86° C.

(b) In the same way as described above the compounds of the following formulae may be prepared:

(2)
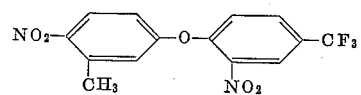

M.P.: 82–85° C.

(3)
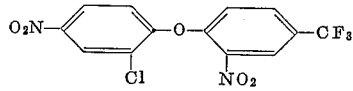

B.P.: 0.1/173–175° C.

(4)
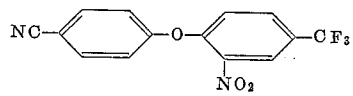

M.P.: 118–121° C.

(5)
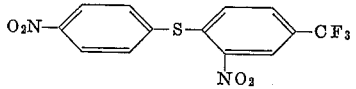

*Example 5*

An emulsion concentrate was prepared with the following ingredients:

400 parts of active principle as described in Example 4 are mixed with 100 parts of dimethylformamide and 100 parts of an emulsifier ("Toximul MP" of the firm Ninol Corp., Chicago), consisting of a mixture of a non-ionic and an anionic surfactant, and diluted with xylene to make 1000 ml. A clear solution is obtained which can be used as a spraying concentrate and be emulsified by being poured into water.

The following examples show results obtained with the compound described in Example 4(a). The compound of Example 4(a) was formulated as described in Example 5.

*Example 6*

(a) In greenhouse experiments the compound of Example 4(a) shows a good effect against various kinds of plants in post-emergence treatment.

The treatment is carried out with 2 and 4 kg. of active principle per hectare 12 days after seeding in flower pots when the plants have developed 1 to 2 true leaves (Table 1).

TABLE 1

| Type of plant | Degree of damage | |
|---|---|---|
| | 2 kg. active substance per hectare | 4 kg. active substance per hectare |
| Sorghum halepense | 9 | 9 |
| Panicum crus galli | 10 | 10 |
| Poa trivialis | 10 | 10 |
| Dactylis glomerata | 10 | 10 |
| Calendula officinalis | 10 | 10 |
| Brassica rapa | 9 | 9 |
| Daucus carota | 4 | 2 |
| Medicago sativa | 8 | 8 |
| Soja max | 3 | 3 |

0=without damage. 10=plants completely killed.

(b) In a greenhouse the compound of Example 4(a) was sprayed on the surface of the soil 2 days after seeding various kinds of plants, i.e. in a pre-emergence treatment, in a quantity of 2 and 4 kg. of active principle per hectare.

The plants sown and the results obtained are shown in the following Table 2:

TABLE 2

| Type of plant | Degree of damage | |
|---|---|---|
| | 2 kg. active substance per hectare | 4 kg. active substance per hectare |
| Triticum | 2 | 2 |
| Hordeum | 2 | 2 |
| Sorghum | 8 | 7 |
| Panicum | 10 | 10 |
| Poa | 10 | 10 |
| Dactylis | 9 | 6 |
| Calendula | 10 | 10 |
| Brassica | 10 | 10 |
| Medicago | 10 | 10 |
| Soja | 1 | 1 |

(c) In a field test the compound of Example 4(a) showed a strong effect in post-emergence treatment against various weeds, undesired grasses and some culture plants whilst not damaging other, important culture plants.

The treatment was carried out 15 days after seeding with 2 and 4 kg. of active principle per hectare when the weeds had developed two true leaves and the culture plants 2 to 3 true leaves. The culture plants sown, the naturally growing weeds, and the results are shown in Table 3.

(d) In a field the compound of Example 4(a) was sprayed on the surface of the soil in a quantity of 2 and 5 kg. of active principle per hectare immediately after seeding of various types of plants, i.e. in the pre-emergence treatment.

The culture plants sown, the naturally growing weeds, and the results are shown in Table 4.

TABLE 3

| | Degree of damage | |
|---|---|---|
| | 2 kg. active substance per hectare | 4 kg. active substance per hectare |
| Type of plant: | | |
| Rice | 0 | 0 |
| Soja bean | 2 | 2 |
| Cotton | 3 | 5 |
| Ground nuts | 0 | 0 |
| Okra | 3 | 5 |
| Peas | 3 | 5 |
| Weeds: | | |
| Setaria glauca | 4 | 10 |
| Eleusine indica | 5 | 8 |
| Digitatria sunguinalis | 5 | 8 |
| Mollugo verticillata | 10 | 10 |
| Amaranthus hybridus | 10 | 10 |
| Solanum nigrum | 10 | 10 |
| Brassica kaber | 7 | 10 |
| Ambrosia artemisiaefolia | 6 | 10 |
| Chenopodium album | 18 | 10 |

A strong effect on the weeds and a good selectivity in the case of rice, ground nuts and soja.

TABLE 4

| | Degree of damage | |
|---|---|---|
| | 2 kg. active substance per hectare | 4 kg. active substance per hectare |
| Culture plants: | | |
| Oats | 2 | 2 |
| Maize | 0 | 0 |
| Rice | 0 | 5 |
| Sorghum | 0 | 5 |
| Squash | 0 | 0 |
| Soja beans | 0 | 0 |
| Cotton | 0 | 0 |
| Ground nuts | 0 | 0 |
| Okra | 0 | 0 |
| Sugar-beet | 0 | 0 |
| Peas | 0 | 0 |
| Carrots | 0 | 4 |
| Weeds: | | |
| Setaria glauca | 8 | 9 |
| Eluesine indica | 7 | 8 |
| Digitaria sanguialis | 7 | 8 |
| Mollugo verticillata | 10 | 10 |
| Amaranthus hybridus | 10 | |
| Cyperus diandrus | 10 | 10 |
| Solanum nigrum | 9 | 10 |
| Brassica kaber | 8 | 9 |
| Ambrosia artemisiaefolia | 7 | 9 |
| Chenopodium album | 10 | 9 |

A good effect on the weeds and excellent selectivity in these cultures. Good effects were also obtained with the compounds set forth in Example 4(b).

*Example 7*

(a) In a manner analogous to that described in Example 1 the following compounds were obtained from para-nitrophenolate and corresponding compound of the formula

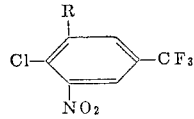

wherein R has the meaning given above in the case of Formula I.

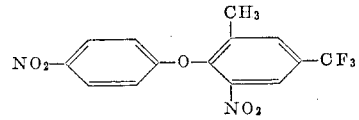

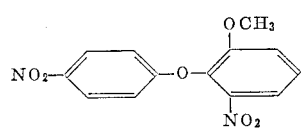

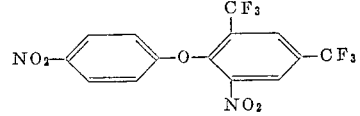

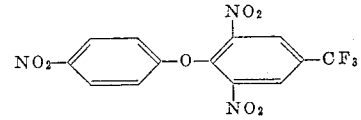

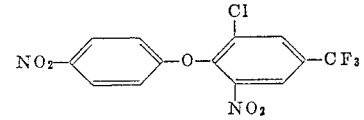

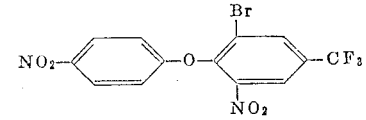

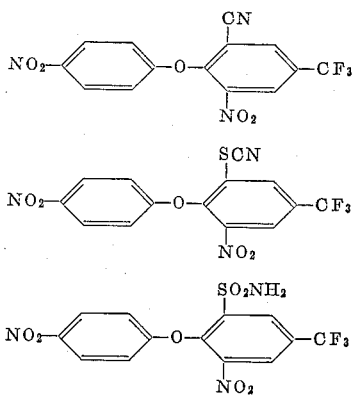

What is claimed is:
1. The method of combating weeds which comprises applying to the area where the weed-combating effect is desired, a weed-killing amount of a compound of the formula

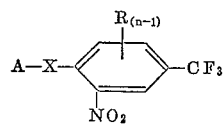

in which A represents a member selected from the group consisting of the phenyl radical and a phenyl radical substituted in at most 3 places by a member selected from the group consisting of the chlorine atom, the bromine atom, a lower alkyl group, a lower alkoxy group, the $CF_3$— group, the nitro group, the cyano group, the thiocyano group and the sulfonamide group, R represents a member selected from the group consisting of the chlorine atom, the bromine atom, a lower alkyl group, a lower alkoxy group, the $CF_3$— group, the nitro group, the cyano group, the thiocyano group and the sulfonamide group, and $n$ represents a whole number of at most 2 and X represents a member selected from the group consisting of oxygen and sulfur.

2. A method as claimed in claim 1 wherein there is used as active principle a compound of the formula

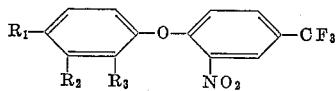

wherein $R_1$ represents a member selected from the group consisting of hydrogen, chlorine, bromine, a lower alkyl radical, a lower alkoxy radical, the group —$NO_2$, the cyano group and the thiocyano group, and $R_2$ and $R_3$ each represents a member selected from the group consisting of hydrogen, chlorine and a lower alkyl radical.

3. A method as claimed in claim 1 wherein the compound of the formula

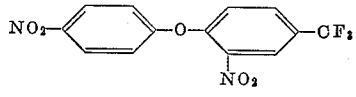

is used as active principle.

4. A method as claimed in claim 1 wherein the compound of the formula

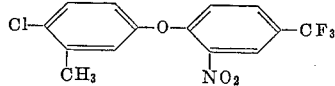

is used as active principle.

5. A method as claimed in claim 1 wherein the compound of the formula

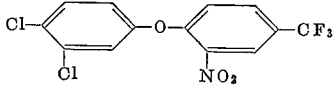

is used as active principle.

6. A method as claimed in claim 1 wherein the compound of the formula

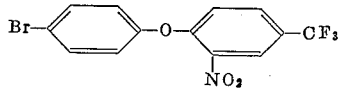

is used as active principle.

7. A method as claimed in claim 1 wherein the compound of the formula

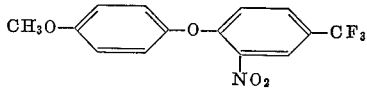

is used as active principle.

8. A method as claimed in claim 1 wherein the compound of the formula

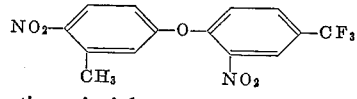

is used as active principle.

9. A method as claimed in claim 1 wherein the compound of the formula

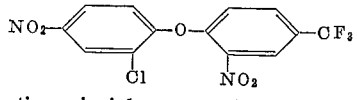

is used as active principle.

10. A method as claimed in claim 1 wherein the compound of the formula

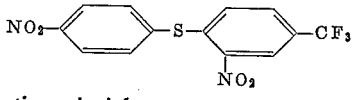

is used as active principle.

References Cited
UNITED STATES PATENTS 3,060,235 10/1962 Martin et al. _____ 71—2.6
3,080,225 3/1963 Wilson et al. _____ 71—2.3

OTHER REFERENCES

Ser. No. 304,859, Pititcolas (A.P.C.), published June 1943.

LEWIS GOTTS, Primary Examiner.

JAMES O. THOMAS, Jr., Examiner.